United States Patent
Qu et al.

(10) Patent No.: US 11,810,404 B2
(45) Date of Patent: Nov. 7, 2023

(54) AUTOMOBILE DIAGNOSTIC METHOD, APPARATUS AND VEHICLE COMMUNICATION INTERFACE

(71) Applicant: AUTEL INTELLIGENT TECHNOLOGY CORP., LTD., Guangdong (CN)

(72) Inventors: Songsong Qu, Guangdong (CN); Huiqiang Lai, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 772 days.

(21) Appl. No.: 16/939,853

(22) Filed: Jul. 27, 2020

(65) Prior Publication Data

US 2021/0012587 A1    Jan. 14, 2021

Related U.S. Application Data

(63) Continuation of application No. PCT/CN2019/071355, filed on Jan. 11, 2019.

(30) Foreign Application Priority Data

Jan. 25, 2018    (CN) .......................... 201810074123.8

(51) Int. Cl.
     *G07C 5/00*      (2006.01)
     *G07C 5/08*      (2006.01)

(52) U.S. Cl.
     CPC ............. *G07C 5/008* (2013.01); *G07C 5/085* (2013.01); *G07C 5/0808* (2013.01)

(58) Field of Classification Search
CPC ....... G07C 5/008; G07C 5/0808; G07C 5/085
See application file for complete search history.

(56) References Cited

U.S. PATENT DOCUMENTS

| | | | |
|---|---|---|---|
| 6,957,133 B1 | 10/2005 | Hunt et al. | |
| 2006/0149434 A1* | 7/2006 | Bertosa | G07C 5/008 701/31.4 |

(Continued)

FOREIGN PATENT DOCUMENTS

| | | |
|---|---|---|
| CN | 102073319 A | 5/2011 |
| CN | 202974664 U | 6/2013 |

(Continued)

OTHER PUBLICATIONS

The First Chinese Office Action dated Apr. 25, 2019; Appln. No. 201810074123.8.

(Continued)

*Primary Examiner* — Michael D Lang (57) ABSTRACT

An embodiment of the present invention discloses an automobile diagnostic method, apparatus and a vehicle communication interface. The automobile diagnostic method is applied to a vehicle communication interface, the method including: acquiring a vehicle identification number of a vehicle based on a first communication protocol; determining a first diagnostic protocol according to the vehicle identification number; acquiring and storing to-be-diagnosed information of the vehicle based on the first diagnostic protocol; and after a connection is established to a diagnostic host, sending the to-be-diagnosed information to the diagnostic host. In the foregoing way, according to the embodiment of the present invention, efficiency of automobile diagnosis may be improved.

10 Claims, 3 Drawing Sheets

(56) References Cited

U.S. PATENT DOCUMENTS

2009/0276115 A1 11/2009 Chen
2017/0024942 A1 1/2017 Drew et al.

FOREIGN PATENT DOCUMENTS

| CN | 103699392 A | 4/2014 |
| CN | 104090565 A | 10/2014 |
| CN | 105955240 A | 9/2016 |
| CN | 107491777 A | 12/2017 |
| CN | 108107875 A | 6/2018 |

OTHER PUBLICATIONS

The International Search Report dated Apr. 16, 2019; PCT/CN2019/071355.
The Extended European Search Report dated Sep. 7, 2021; Appln. No. 19743818.7.
The Second Chinese Office Action dated Aug. 4, 2021; Appln. No. 202010014752.9 with English Translation.

* cited by examiner

AUTOMOBILE DIAGNOSTIC METHOD, APPARATUS AND VEHICLE COMMUNICATION INTERFACE

This application is a continuation application of International Application No. PCT/CN2019/071355, filed on Jan. 11, 2019, which claims priority of Chinese Patent Application No. 201810074123.8, filed on Jan. 25, 2018, which is incorporated herein by reference in its entirety.

BACKGROUND

Technical Field

The present application relates to the field of automotive electronic technologies, and in particular, to an automobile diagnostic method, apparatus and a vehicle communication interface.

Related Art

As an automotive automation degree is increasingly high, a computer control system is adopted in an increasing number of vehicles, and structures of the vehicles are becoming increasingly complex, causing increasingly complex vehicle faults. Under such background, a function of an automobile diagnostic device is more obvious. For a maintenance technician, a rapid and accurate diagnostic device with complete functions may more efficiently diagnose a fault in an automobile.

How to improve diagnostic efficiency of the automobile diagnostic device becomes a subject actively studied by those skilled in the art.

SUMMARY

Embodiments of the present invention mainly resolve a problem of providing a method and an apparatus that rapidly implements automobile diagnosis, and a vehicle communication interface, so that efficiency of the automobile diagnosis may be improved.

A technical solution adopted in an embodiment of the present invention is shown as below: In a first aspect, an automobile diagnostic method applied to a vehicle communication interface is provided, the method including:
  acquiring a vehicle identification number of a vehicle based on a first communication protocol;
  determining a first diagnostic protocol according to the vehicle identification number;
  acquiring and storing to-be-diagnosed information of the vehicle based on the first diagnostic protocol; and
  after a connection is established to a diagnostic host, sending the to-be-diagnosed information to the diagnostic host.

Optionally, the method further includes:
  determining a first pin of an OBD interface and at least one candidate communication protocol related to the first pin;
  successively scanning the first pin based on the at least one candidate communication protocol; and
  using a candidate communication protocol on which successful scanning is based as the first communication protocol.

Optionally, the method further includes:
  detecting whether a voltage signal is output in a selected pin in the OBD interface; and the determining a first pin of the OBD interface includes:
  determining a selected pin in which the voltage signal is output as the first pin.

In some embodiments, the acquiring a vehicle identification number of a vehicle based on a first communication protocol includes:
  based on the first communication protocol, acquiring the vehicle identification number of the vehicle from a vehicle system corresponding to the first pin.

In some embodiments, the determining a first diagnostic protocol according to the vehicle identification number includes:
  parsing the vehicle identification number to acquire vehicle information of the vehicle;
  searching system information corresponding to the vehicle information from a pre-stored system configuration table according to the vehicle information, the system information including a system, a pin corresponding to the system and a diagnostic protocol supported by the system; and
  determining the diagnostic protocol supported by the system as the first diagnostic protocol.

Optionally, the method further includes:
  determining whether the pin corresponding to the system in the system information includes a second pin, the second pin being a pin in which a voltage signal is not output in the selected pin;
  if yes, removing a diagnostic protocol related to the second pin from the first diagnostic protocol to obtain a second diagnostic protocol; and
  the acquiring and storing to-be-diagnosed information of the vehicle based on the first diagnostic protocol includes:
  acquiring and storing to-be-diagnosed information of the vehicle based on the second diagnostic protocol.

In a second aspect, an embodiment of the present invention provides an automobile diagnostic apparatus applied to a vehicle communication interface, the apparatus including:
  a VIN acquiring module configured acquire a vehicle identification number of a vehicle based on a first communication protocol;
  a diagnostic protocol determining module configured to determine a first diagnostic protocol according to the vehicle identification number;
  a to-be-diagnosed information acquiring module configured to acquire and store to-be-diagnosed information of the vehicle based on the first diagnostic protocol; and
  a to-be-diagnosed information sending module configured to, after a connection is established to a diagnostic host, send the to-be-diagnosed information to the diagnostic host.

Optionally, the apparatus further includes:
  a first pin determining module configured to determine a first pin of an OBD interface and at least one candidate communication protocol related to the first pin;
  a first pin scanning module configured to successively scan the first pin based on the at least one candidate communication protocol; and
  a communication protocol determining module configured to use a candidate communication protocol on which successful scanning is based as the first communication protocol.

Optionally, the apparatus further includes:
  a voltage signal detecting module configured to detect whether a voltage signal is output in a selected pin in the OBD interface; and the first pin determining module further configured to:
determine a selected pin in which the voltage signal is output as the first pin.

In some embodiments, the VIN acquiring module is specifically configured to:
based on the first communication protocol, acquire the vehicle identification number of the vehicle from a vehicle system corresponding to the first pin.

In some embodiments, the diagnostic protocol determining module is specifically configured to:
parse the vehicle identification number to acquire vehicle information of the vehicle;
search system information corresponding to the vehicle information from a pre-stored system configuration table according to the vehicle information, the system information including a system, a pin corresponding to the system and a diagnostic protocol supported by the system; and
determine the diagnostic protocol supported by the system as the first diagnostic protocol.

Optionally, the apparatus further includes:
a second pin determining module configured to determine whether the pin corresponding to the system in the system information includes a second pin, the second pin being a pin in which a voltage signal is not output in the selected pin;
the diagnostic protocol determining module further configured to remove a diagnostic protocol related to the second pin from the first diagnostic protocol to obtain a second diagnostic protocol; and
the to-be-diagnosed information acquiring module further configured to:
acquire and store to-be-diagnosed information of the vehicle based on the second diagnostic protocol.

In a third aspect, an embodiment of the present invention provides a vehicle communication interface, including:
at least one processor; and
a memory connected to the at least one processor, wherein the memory stores a computer instruction, the at least one processor being configured to invoke the computer instruction to perform the foregoing method.

In a fourth aspect, an embodiment of the present invention provides a non-volatile computer readable storage medium. The computer readable storage medium stores a computer executable instruction. The computer executable instruction is used to be executed by a vehicle communication interface to implement the foregoing method.

In a fifth aspect, an embodiment of the present invention provides a computer program product. The computer program product includes a computer program stored on a non-volatile computer readable storage medium. The computer program includes a program instruction. The program instruction is used to be executed by a vehicle communication interface to implement the foregoing method.

In the embodiments of the present invention, after the vehicle communication interface is connected to the OBD interface on the vehicle, the vehicle information of the vehicle may be automatically acquired, and the to-be-diagnosed information of the vehicle may be further acquired according to the vehicle information. After a connection is established to the diagnostic host, the to-be-diagnosed information is sent to the diagnostic host, simplifying an information acquiring process of the diagnostic host and improving efficiency of the automobile diagnosis.

DETAILED DESCRIPTION

The technical solution of the present invention will be clearly and completely described below with reference to the accompanying drawings. Obviously, the described embodiments are part of the present invention, but not all of them. Based on the embodiments of the present invention, all other embodiments obtained by a person of ordinary skill in the art without creative efforts shall fall within the protection scope of the present invention.

In addition, the technical features involved in the different embodiments of the present invention described below can be combined with each other as long as they do not conflict with each other.

Figure 1:
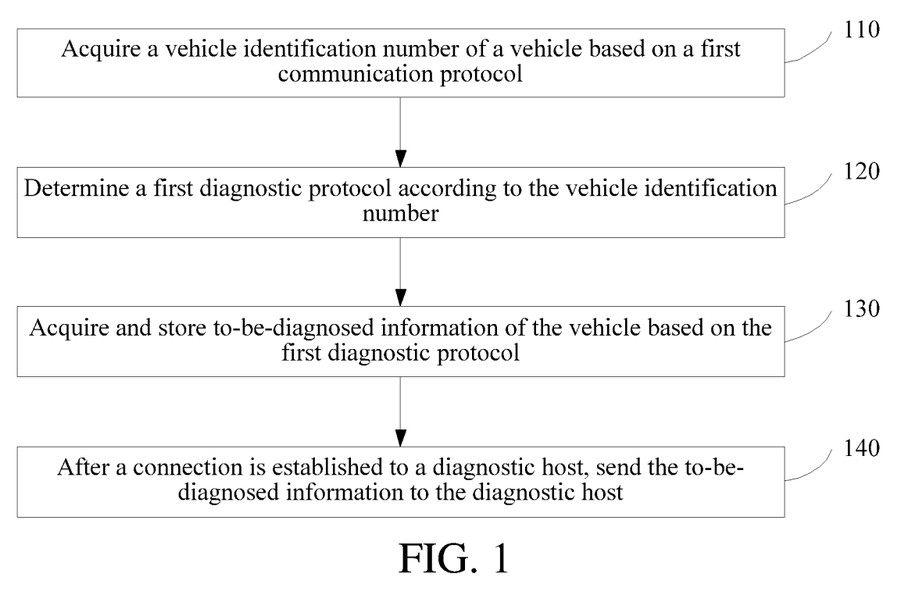
FIG. 1 is a schematic flowchart of an automobile diagnostic method according to an embodiment of the present invention.

In a first aspect, an embodiment of the present invention provides an automobile diagnostic method applied to a vehicle communication interface, the vehicle communication interface being used to be connected to a vehicle and a diagnostic host, respectively. Referring to FIG. 1, the method includes:
step 110: acquiring a vehicle identification number of a vehicle based on a first communication protocol.

In the embodiment of the present application, the first communication protocol may be understood as an OBD link layer protocol, which is a general public protocol in the automotive industry, such as J1850, KWP, ISO9141, STD CAN and other types of protocols.

In an implementation, an OBD interface on the vehicle includes a plurality of pins, the plurality of pins corresponding to a plurality of ECUs in the vehicle, for example, at least one pin corresponding to an ECU of a system. After a vehicle communication interface VCI is connected to the OBD interface, the vehicle communication interface VCI may be communicably connected to the ECUs corresponding to the pins through the pins based on a communication protocol supported by the ECU. First, the VCI scanning the pins of the OBD interface through the OBD link layer protocol refers to that the VCI successively sends, to the pins, connection requests of a protocol format based on the OBD link layer protocol. If the VCI receives a response to the connection request based on one OBD link layer protocol, the OBD link layer protocol may be used as a first communication protocol.

The VCI may be communicably connected to the ECU corresponding to the pin based on the first communication protocol, so that the vehicle identification number of the vehicle may be acquired from the ECU. Generally, the ECU belongs to an engine system of the vehicle, which is not limited in the embodiment of the present application.

Each pin in the OBD interface may be scanned through a protocol, or a selected pin in the OBD interface is only scanned through the protocol. The pins in the OBD interface may be scanned through all of the OBD link layer protocols, or the pins in the OBD interface are scanned through one or more of the selected OBD link layer protocols.

In an embodiment, the pins in the OBD interface are scanned in order of standard CAN 500K, standard CAN 250K, extended CAN 500K, extended CAN 250K, PWM, VPW, KWP2000 and ISO9141 protocols, provided that a response based on any communication protocol is received, then scanning is completed, and the communication protocol is determined as the first communication protocol.

Accordingly, the vehicle identification number of the vehicle may be acquired from the ECU according to the first communication protocol being in communication with the ECU corresponding to the pin.

The vehicle identification number is a set of character codes assigned to a vehicle by an automobile manufacturer for identification. The vehicle identification number is abbreviated as VIN in English.

The VIN contains a manufacturer, a year model, a vehicle model, a body type, an engine type, an engine code, an assembly location and other equipping information. Such information may be understood as vehicle information.

Step 120: Determining the first diagnostic protocol according to the vehicle identification number.

In an implementation, first, the VIN may be parsed to acquire vehicle information of the vehicle. The acquired vehicle information may be one or more of the foregoing vehicle information, which is not limited herein.

In this embodiment, the vehicle information obtained through parsing of the VIN includes, but is not limited to, the vehicle model and year model, and may further include the engine type or the manufacturer, etc.

According to the foregoing vehicle information, for example, according to the vehicle model and the year model, system information corresponding to the foregoing vehicle information is searched from a system configuration table pre-stored in the vehicle communication interface, the system information including a system and a diagnostic protocol supported by the system. The diagnostic protocol supported by the system in the system information is determined as the first diagnostic protocol.

Exemplarily, the system may be an engine system, an anti-lock braking system, a four-wheel drive system, an electronically controlled automatic transmission, an active suspension system and an airbag system, etc.

Herein, the system configuration table pre-stored in the vehicle communication interface may include a correspondence between the vehicle information and the system information. For example, one piece of vehicle information may correspond to a plurality of pieces of system information, and it may be understood that a system respectively represented by the plurality of pieces of system information belongs to a vehicle represented by the vehicle information.

Optionally, the vehicle communication interface may update the pre-stored system configuration table, for example, it is ensured that a latest version of the system configuration table may be updated to the vehicle communication interface in time. The vehicle communication interface may acquire the latest version of the system configuration table from a diagnostic host, or the vehicle communication interface may acquire the latest version of the system configuration table from a server, which is not limited herein.

Step 130: Acquiring and storing to-be-diagnosed information of the vehicle based on the first diagnostic protocol.

After the first diagnostic protocol is determined, a protocol based on which an ECU of a system is in communication with a VCI may be determined. Accordingly, information interaction with the ECU of the system may be performed according to the first diagnostic protocol. For example, information such as a fault code, a data stream and a freeze frame sent by the ECU of the system is acquired, the freeze frame referring to current data stream information stored in the ECU when the ECU detects a fault.

Step 140: After a connection is established to a diagnostic host, sending the to-be-diagnosed information to the diagnostic host.

The vehicle communication interface may be connected to the diagnostic host through a wired connection technology, such as a universal serial bus (USB) technology or a wireless connection technology like Bluetooth and (WIFI), etc.

After being connected to the diagnostic host, the vehicle communication interface sends the to-be-diagnosed information to the diagnostic host, so that the to-be-diagnosed information is displayed on a display of the diagnostic host for the user to view. Alternatively, the diagnostic host is caused to diagnose the vehicle according to the received to-be-diagnosed information.

In the embodiment of the present invention, after the vehicle communication interface is connected to the OBD interface on the vehicle, the vehicle information of the vehicle may be acquired, and the to-be-diagnosed information of the vehicle may be further acquired according to the vehicle information. After a connection is established to the diagnostic host, the to-be-diagnosed information is sent to the diagnostic host, simplifying an information acquiring process of the diagnostic host and improving efficiency of the automobile diagnosis.

Figure 2:
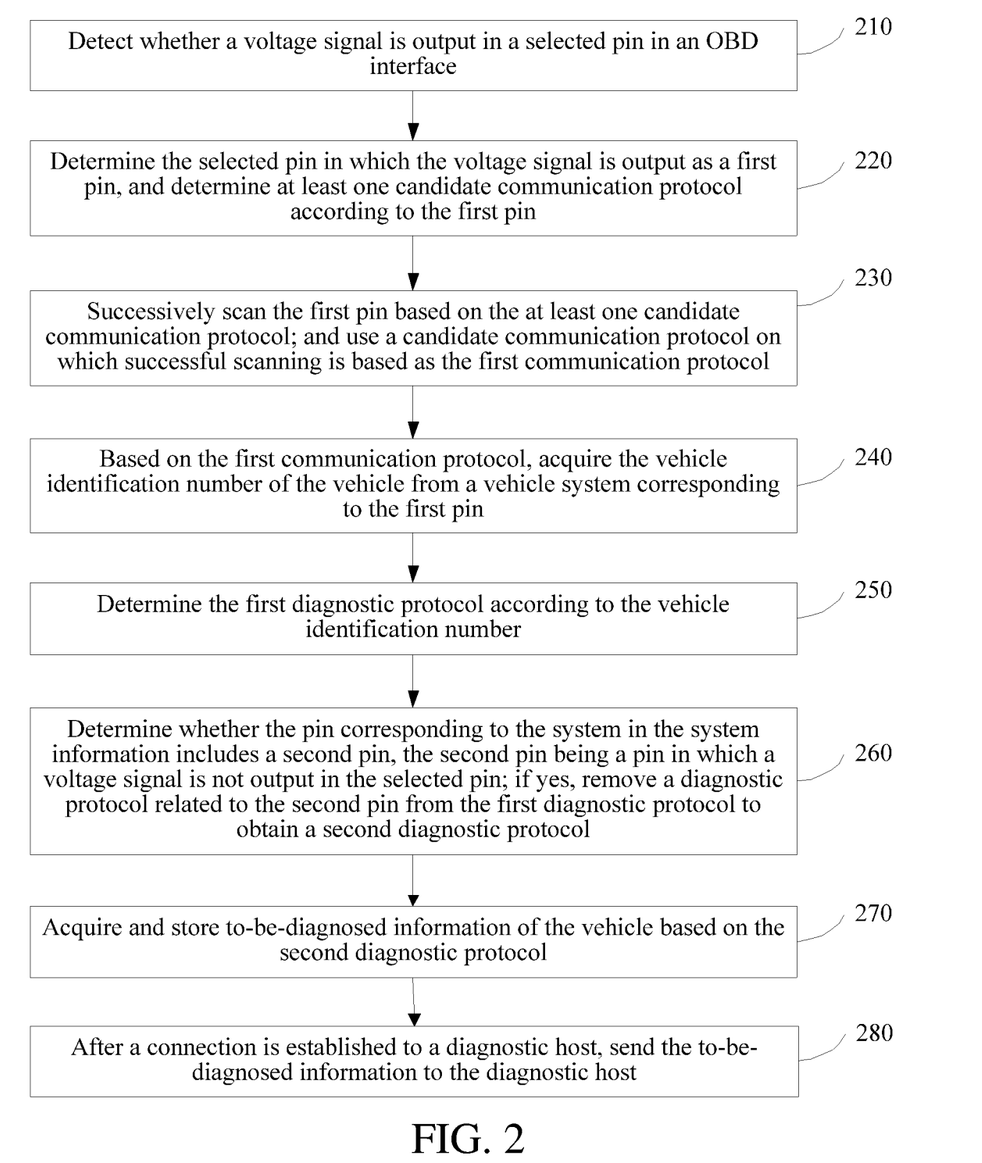
FIG. 2 is a schematic flowchart of an automobile diagnostic method according to another embodiment of the present invention.

Referring to FIG. 2, FIG. 2 is an automobile diagnostic method applied to a vehicle communication interface disclosed according to another embodiment of the present invention, the vehicle communication interface being used to be connected to a vehicle and a diagnostic host, respectively, the method including:

Step 210: Detecting whether a voltage signal is output in a selected pin in the OBD interface.

After the vehicle communication interface is connected to an OBD interface on the vehicle, exemplarily, it is detected whether the voltage signal is output in the selected pin in the OBD interface through an ADC function of the vehicle communication interface. ADC is an abbreviation of an analog-to-digital converter, which refers to an analog/digital converter or an analog-to-digital converter configured to complete a conversion from an analog signal to a digital signal.

After the vehicle communication interface is powered on with an automobile device, it may be detected whether the voltage signal is output in the selected pin in the OBD interface through an ADC function of an internal main chip or peripheral chip of the vehicle communication interface.

For example, an AM335x chip of TI and an ATSAME70N21 chip of Atmel both have the ADC function.

Generally, the selected pin may include 2 (PWM/VPW), 6 (CAN) and 7 (KWP2000/ISO9141) pins in the OBD interface.

Step 220: Determining the selected pin in which the voltage signal is output as a first pin, and determining at least one candidate communication protocol according to the first pin.

Herein, the candidate communication protocol may refer to the foregoing OBD link layer protocol. A communication protocol related to the first pin may be determined as the candidate communication protocol. For example, if the first pin is the foregoing 6-pin, a candidate communication protocol related thereto may be a CAN protocol.

In an embodiment, if the 2-pin of the OBD interface does not detect an output voltage, it is considered that there are no PWM and VPW protocols for the automotive device. The 6-pin and 7-pin that output voltage signals are determined as the first pins, respectively, standard CAN 500K, standard CAN 250K, extended CAN 500K and extended CAN 250K protocol related to the 6-pin are determined as candidate communication protocols, and the KWP2000 and ISO9141 protocols related to 7-pin are determined as the candidate communication protocols.

In another embodiment, if the 7-pin of the OBD interface does not detect an output voltage, it is considered that there are no KWP and ISO protocols in this automotive device. The 2-pin and 6-pin that output voltage signals are determined as the first pins, respectively, the PWM and VPW protocols related to the 2-pin are determined as the candidate communication protocols, and the standard CAN 500K, the standard CAN 250K, the extended CAN 500K and the extended CAN 250K protocols related to 6-pin are determined as the candidate communication protocols.

Step 230: Successively scanning the first pin based on the at least one candidate communication protocol; and using a candidate communication protocol on which successful scanning is based as the first communication protocol.

For example, if the 2-pin of the OBD interface does not detect an output voltage, the 6-pin and 7-pin are determined as the first pins, and based on the standard CAN 500K, standard CAN 250K, extended CAN 500K and extended CAN 250K protocols, the 6 pin of the OBD interface is scanned successively. If, during scanning of the 6-pin based on a protocol, and a response based on the protocol is obtained, the protocol is determined as a first communication protocol. For example, during scanning of the 6-pin based on the standard CAN 500K protocol, a response based on the standard CAN 500K protocol is obtained, the standard CAN 500K protocol may be determined as the first communication protocol.

Similarly, the 7-pin may be scanned based on a candidate protocol related to the 7-pin. During the foregoing process, the 6-pin and 7-pin may be scanned successively, or may be scanned simultaneously based on respective protocols related thereto, which is not limited herein.

Step 240: Based on the first communication protocol, acquiring the vehicle identification number of the vehicle from a vehicle system corresponding to the first pin.

In an implementation, the vehicle identification number is usually stored in an ECU of an engine system. If the first communication protocol is determined from a certain first pin, it indicates that a vehicle system corresponding to the first pin is the engine system, and according to the first communication protocol, the vehicle identification number is acquired from the vehicle system corresponding to the first pin.

Step 250: Determining the first diagnostic protocol according to the vehicle identification number.

Similarly, vehicle information of the vehicle is acquired through analysis of a VIN, and system information corresponding to the foregoing vehicle information is searched from a system configuration table pre-stored in the vehicle communication interface according to the foregoing vehicle information. In addition to a system and a diagnostic protocol supported by the system, the system information in this embodiment may further include a pin corresponding to the system.

Step 260: Determining whether the pin corresponding to the system in the system information includes a second pin, the second pin being a pin in which a voltage signal is not output in the selected pin; if yes, removing a diagnostic protocol related to the second pin from the first diagnostic protocol to obtain a second diagnostic protocol.

Generally, the system configuration table acquired according to the vehicle information is the system configuration table corresponding to highest configuration of a vehicle model. For vehicles of different configurations of a same vehicle model, there may be no some systems and diagnostic protocols supported by the systems.

If a pin that does not output a voltage signal in selected pins of the OBD interface is determined as a second pin, the vehicle also does not include a system corresponding to the second pin. If the pin corresponding to a system in system information includes the second pin, a diagnostic protocol related to the second pin is removed from the diagnostic protocol supported by the system to obtain the second diagnostic protocol.

For example, when it is detected whether the foregoing pin outputs a voltage, if it is determined that no voltage is output from the 2-pin, a diagnostic protocol that should be removed includes the PWM protocol and the VPW protocol related to the 2-pin. If the diagnostic protocol supported by the system includes the PWM protocol or the VPW protocol, the PWM protocol or the VPW protocol needs to be removed from the diagnostic protocols to obtain a second diagnostic protocol after removal.

Step 270: Acquiring and storing to-be-diagnosed information of the vehicle based on the second diagnostic protocol.

Step 280: After a connection is established to a diagnostic host, sending the to-be-diagnosed information to the diagnostic host.

Referring to a first embodiment for step 270 to step 280, which is within a range easily understood by those skilled in the art.

In this embodiment, after the vehicle communication interface is connected to the OBD interface on the vehicle, through detection whether a selected pin in the OBD interface outputs a voltage signal, the selected pin that outputs the voltage signal is determined as the first pin, at least one candidate communication protocol is determined according to the first pin, and the selected pin that does not output a voltage signal is determined as the second pin, the second diagnostic protocol is determined according to the second pin, so that time for determining the first communication protocol and time for scanning ECU of the vehicle is reduced, further improving efficiency of automobile diagnosis.

Figure 3:
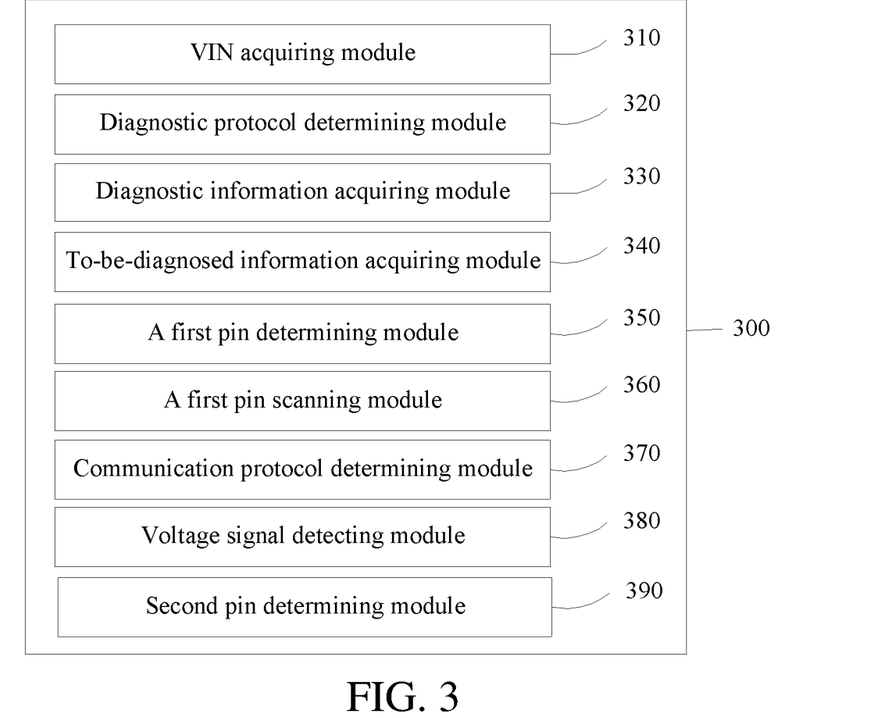
FIG. 3 is a schematic structural diagram of an automobile diagnostic apparatus according to an embodiment of the present invention.

In a second aspect, an embodiment of the present invention provides an automobile diagnostic apparatus applied to a vehicle communication interface, the vehicle communication interface being used to be connected to a vehicle and a diagnostic host, respectively. Referring to FIG. 3, the apparatus 300 includes:

a VIN acquiring module 310 configured to acquire a vehicle identification number of a vehicle based on a first communication protocol;

a diagnostic protocol determining module 320 configured to determine a first diagnostic protocol according to the vehicle identification number;

a to-be-diagnosed information acquiring module 330 configured to acquire and store to-be-diagnosed information of the vehicle based on the first diagnostic protocol; and a to-be-diagnosed information sending module 340 configured to, after a connection is established to a diagnostic host, send the to-be-diagnosed information to the diagnostic host.

In this embodiment, after the vehicle communication interface is connected to the OBD interface on the vehicle, the vehicle information of the vehicle is obtained automatically through the VIN acquiring module 310, and the to-be-diagnosed information acquiring module 330 further acquires the to-be-diagnosed information of the vehicle based on the vehicle information, and after a connection is established to the diagnostic host, the to-be-diagnosed information sending module 340 sends the to-be-diagnosed information to the diagnostic host, simplifying an information acquiring process of the diagnostic host and improving efficiency of automobile diagnosis.

In an embodiment, the apparatus 300 further includes:
a first pin determining module 350 configured to determine a first pin of an OBD interface and at least one candidate communication protocol related to the first pin;
a first pin scanning module 360 configured to successively scan the first pin based on the at least one candidate communication protocol; and
a communication protocol determining module 370 configured to use a candidate communication protocol on which successful scanning is based as the first communication protocol.

Optionally, the apparatus 300 further includes:
a voltage signal detecting module 380 configured to detect whether a voltage signal is output in a selected pin in the OBD interface;
the first pin determining module 350 further configured to:
determine a selected pin in which a voltage signal is output as the first pin.

The VIN acquiring module 310 is specifically configured to:
Based on the first communication protocol, acquire the vehicle identification number of the vehicle from a vehicle system corresponding to the first pin.

Optionally, the diagnostic protocol determining module 320 is specifically configured to:
parse the vehicle identification number to acquire vehicle information of the vehicle;
search system information corresponding to the vehicle information from a pre-stored system configuration table according to the vehicle information, the system information including a system, a pin corresponding to the system and a diagnostic protocol supported by the system; and
determine the diagnostic protocol supported by the system as the first diagnostic protocol.

The apparatus 300 further includes:
a second pin determining module 390 configured to determine whether the pin corresponding to the system in the system information includes a second pin, the second pin being a pin in which a voltage signal is not output in the selected pin;
the diagnostic protocol determining module 320 further configured to remove a diagnostic protocol related to the second pin from the first diagnostic protocol to obtain a second diagnostic protocol; and
the to-be-diagnosed information acquiring module 330 further configured to:
acquire and store to-be-diagnosed information of the vehicle based on the second diagnostic protocol.

In this embodiment, after the vehicle communication interface is connected to the OBD interface on the vehicle, it is detected through the voltage signal detecting module 380 whether a selected pin in the OBD interface outputs a voltage signal, the first pin determining module 350 determines the selected pin that outputs the voltage signal as the first pin, at least one candidate communication protocol is determined according to the first pin, and the selected pin that does not output a voltage signal is determined as the second pin, and the diagnostic protocol determining module 320 determines the second diagnostic protocol according to the second pin, so that time for determining the first communication protocol and time for scanning ECU of the vehicle are reduced, further improving efficiency of automobile diagnosis.

Similarly, because an apparatus embodiment and a method embodiment of the embodiment of the present invention are based on a same inventive concept, technical contents in the method embodiment also apply to the apparatus embodiment. Therefore, technical contents in the apparatus embodiment that are the same as those in the method embodiment are not described herein.

In order to better achieve the foregoing objective, in a third aspect, an embodiment of the present invention further provides a vehicle communication interface, the vehicle communication interface being used to be connected to a vehicle and a diagnostic host. The vehicle communication interface stores a computer instruction, the automobile diagnostic method in any of the foregoing method embodiments being executed through the computer instruction. In particular, a structure of the vehicle communication interface may be implemented through the following embodiments.

Figure 4:
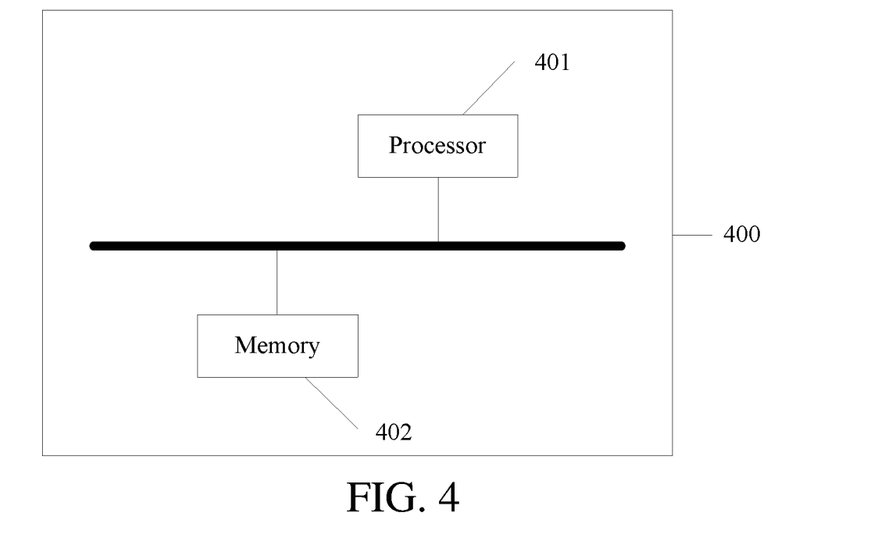
FIG. 4 is a schematic structural diagram of a vehicle communication interface according to an embodiment of the present invention.

FIG. 4 is a schematic structural diagram of a vehicle communication interface 400 according to an embodiment of the present invention. As shown in FIG. 4, the vehicle communication interface 400 includes: one or more processors 401 and a memory 402, one processor 401 being used as an example in FIG. 4.

The processor 401 and the memory 402 may be connected through a bus or in other manners. In FIG. 4, the processor and the memory being connected through a bus is used as an example.

The memory 402, as a non-volatile computer readable storage medium, may be configured to store a non-volatile software program, a non-volatile computer-executable program and module, such as corresponding program instructions/modules (for example, the modules shown in FIG. 3) of the automobile diagnostic method in the embodiment of the present invention. The processor 401 executes various functional applications and data processing of the automobile diagnostic apparatus by running non-volatile software programs, instructions and modules stored in the memory 402, that is, the automobile diagnostic method in the foregoing method embodiment and functions of the modules in the foregoing apparatus embodiment are implemented.

The memory 402 may include a high-speed random-access memory, and may further include a non-volatile memory, such as at least one magnetic disk storage device, a flash memory device or other non-volatile solid-state storage devices. In some embodiments, the memory 402 may optionally include remotely disposed memories relative to the processor 401, these remote memories being connected to the processor 401 via a network. An example of the foregoing network includes, but is not limited to, the Internet, an intranet, a local area network, a mobile communications network and a combination thereof.

The program instructions/modules are stored in the memory 402, when executed by the one or more processors 401, the automobile diagnostic method in any of the foregoing method embodiments being executed, for example, the steps shown in FIG. 1 and FIG. 2 as described above being executed. Alternatively, functions of the modules shown in FIG. 3 may be further implemented.

Optionally, the vehicle communication interface VCI may further include at least one communication interface. The VCI may be in communication with the OBD and the diagnostic host respectively using a same communication interface, or may be in communication with the OBD and the diagnostic host respectively using different communication interfaces, which are not limited herein.

In an implementation, the VCI described in the embodiment of the present application may be integrated in the diagnostic host, which is not limited herein.

In the embodiment, after the vehicle communication interface is connected to the OBD interface on the vehicle, the vehicle information of the vehicle may be acquired automatically, and the to-be-diagnosed information of the vehicle may be further acquired according to the vehicle information. After a connection is established to the diagnostic host, the to-be-diagnosed information is sent to the diagnostic host, simplifying an information acquiring process of the diagnostic host and improving efficiency of the automobile diagnosis.

In a fourth aspect, an embodiment of the present invention further provides a non-volatile computer storage medium. The computer storage medium stores a computer-executable instruction. The computer-executable instruction is used to be executed by one or more processors, for example, one processor 401 in FIG. 4, of a vehicle communication interface, so that the one or more processors may perform the automobile diagnostic method in any of the foregoing method embodiments, for example, the foregoing steps shown in FIG. 1 and FIG. 2 are performed. In addition, functions of the modules shown in FIG. 3 may be implemented.

For the foregoing product, the method provided in the embodiments of the present application may be performed, and the corresponding functional modules for performing the method and beneficial effects thereof are provided. For technical details not described in detail in this embodiment, reference may be made to the method according to the embodiment of the present invention.

The device embodiments described above are merely example, where the units described as separate components may or may not be physically separated, and the components shown as units may or may not be physical units, that is, may be located at one place, or it can be distributed across a plurality of network elements. Some or all of the modules may be selected according to actual needs to achieve the objective of the solution of this embodiment.

Through the description of the above embodiments, those skilled in the art can clearly understand that the embodiments can be implemented by means of software plus a general hardware platform, and certainly, they can also be implemented by hardware. Based on such an understanding, the above-mentioned technical solutions that are essentially or contribute to related technologies can be embodied in the form of software products, which can be stored in computer-readable storage media such as ROM/RAM, a magnetic disk, an optical disc, and the like, including a plurality of instructions for causing a computer device (which may be a personal computer, a server, or a network device, etc.) to perform the methods described in various embodiments or certain parts of the embodiments.

Finally, it should be explained that: the above embodiments are only used to describe the technical solution of the present invention, but not limited thereto; under the idea of the present invention, the technical features in the above embodiments or different embodiments may also be combined. The steps can be implemented in any order, and there are many other variations of different aspects of the invention as described above, for the sake of brevity, they are not provided in the details; although the present invention is described in detail with reference to the foregoing embodiments, those of ordinary skill in the art should understand that: it can still modify the technical solutions described in the foregoing embodiments, or equivalently replace some of the technical features; and these modifications or replacements do not make the essence of the corresponding technical solutions separate from the scope of the technical solutions of the embodiments of the present application.

What is claimed is:

1. An automobile diagnostic method applied to a vehicle communication interface, wherein the method comprises:
   detecting whether a voltage signal is output in a selected pin in a OBD interface;
   determining a selected pin in which the voltage signal is output as a first pin;
   determining the first pin of the OBD interface and at least one candidate communication protocol related to the first pin;
   successively scanning the first pin based on the at least one candidate communication protocol; and
   using a candidate communication protocol on which successful scanning is based as a first communication protocol;
   acquiring a vehicle identification number of a vehicle based on the first communication protocol;
   determining a first diagnostic protocol according to the vehicle identification number;
   acquiring and storing to-be-diagnosed information of the vehicle based on the first diagnostic protocol; and
   after a connection is established to a diagnostic host, sending the to-be-diagnosed information to the diagnostic host.

2. The method according to claim 1, wherein the acquiring a vehicle identification number of a vehicle based on a first communication protocol comprises:
   based on the first communication protocol, acquiring the vehicle identification number of the vehicle from a vehicle system corresponding to the first pin.

3. The method according to claim 1, wherein the determining a first diagnostic protocol according to the vehicle identification number comprises:
   parsing the vehicle identification number to acquire vehicle information of the vehicle;
   searching system information corresponding to the vehicle information from a pre-stored system configuration table according to the vehicle information, the system information comprising a system, a pin corresponding to the system and a diagnostic protocol supported by the system; and
   determining the diagnostic protocol supported by the system as the first diagnostic protocol.

4. The method according to claim 3, further comprising:
   determining whether the pin corresponding to the system in the system information comprises a second pin, the second pin being a pin in which a voltage signal is not output in the selected pin;
   if yes, removing a diagnostic protocol related to the second pin from the first diagnostic protocol to obtain a second diagnostic protocol; and
   the acquiring and storing to-be-diagnosed information of the vehicle based on the first diagnostic protocol comprising:
   acquiring and storing to-be-diagnosed information of the vehicle based on the second diagnostic protocol.

5. An automobile diagnostic apparatus applied to a vehicle communication interface, wherein the apparatus comprises:
a voltage signal detecting module configured to detect whether a voltage signal is output in a selected pin in the OBD interface;
a first pin determining module configured to determine a selected pin in which the voltage signal is output as a first pin, and at least one candidate communication protocol related to the first pin;
a first pin scanning module configured to successively scan the first pin based on the at least one candidate communication protocol; and
a communication protocol determining module configured to use a candidate communication protocol on which successful scanning is based as a first communication protocol;
a VIN acquiring module configured acquire a vehicle identification number of a vehicle based on the first communication protocol;
a diagnostic protocol determining module configured to determine a first diagnostic protocol according to the vehicle identification number;
a to-be-diagnosed information acquiring module configured to acquire and store to-be-diagnosed information of the vehicle based on the first diagnostic protocol; and
a to-be-diagnosed information sending module configured to, after a connection is established to a diagnostic host, send the to-be-diagnosed information to the diagnostic host.

6. The apparatus according to claim 5, wherein the VIN acquiring module is specifically configured to:
based on the first communication protocol, acquire the vehicle identification number of the vehicle from a vehicle system corresponding to the first pin.

7. The apparatus according to claim 5, wherein the diagnostic protocol determining module is specifically configured to:
parse the vehicle identification number to acquire vehicle information of the vehicle;
search system information corresponding to the vehicle information from a pre-stored system configuration table according to the vehicle information, the system information comprising a system, a pin corresponding to the system and a diagnostic protocol supported by the system; and
determine the diagnostic protocol supported by the system as the first diagnostic protocol.

8. The apparatus according to claim 7, further comprising:
a second pin determining module configured to determine whether the pin corresponding to the system in the system information comprises a second pin, the second pin being a pin in which a voltage signal is not output in the selected pin;
the diagnostic protocol determining module further configured to remove a diagnostic protocol related to the second pin from the first diagnostic protocol to obtain a second diagnostic protocol; and
the to-be-diagnosed information acquiring module further configured to:
acquire and store to-be-diagnosed information of the vehicle based on the second diagnostic protocol.

9. A vehicle communication interface, comprising:
at least one processor; and
a memory connected to the at least one processor, wherein
the memory stores a computer instruction, the at least one processor being configured to invoke the computer instruction to detect whether a voltage signal is output in a selected pin in a OBD interface; determine a selected pin in which the voltage signal is output as a first pin; determine the first pin of the OBD interface and at least one candidate communication protocol related to the first pin; successively scan the first pin based on the at least one candidate communication protocol; and use a candidate communication protocol on which successful scanning is based as a first communication protocol; acquire a vehicle identification number of a vehicle based on the first communication protocol; determine a first diagnostic protocol according to the vehicle identification number; acquire and store to-be-diagnosed information of the vehicle based on the first diagnostic protocol; and after a connection is established to a diagnostic host, send the to-be-diagnosed information to the diagnostic host.

10. A non-volatile computer readable storage medium, wherein the computer readable storage medium stores a computer executable instruction, the computer executable instruction being used to be executed by a vehicle communication interface, to detect whether a voltage signal is output in a selected pin in a OBD interface; determine a selected pin in which the voltage signal is output as a first pin; determine the first pin of the OBD interface and at least one candidate communication protocol related to the first pin; successively scan the first pin based on the at least one candidate communication protocol; and use a candidate communication protocol on which successful scanning is based as a first communication protocol; acquire a vehicle identification number of a vehicle based on the first communication protocol; determine a first diagnostic protocol according to the vehicle identification number; acquire and store to-be-diagnosed information of the vehicle based on the first diagnostic protocol; and after a connection is established to a diagnostic host, send the to-be-diagnosed information to the diagnostic host.

* * * * *